United States Patent [19]

Araki et al.

[11] Patent Number: 5,391,627
[45] Date of Patent: Feb. 21, 1995

[54] HEAT-RESISTANT, OIL-RESISTANT RUBBER COMPOSITION

[75] Inventors: Junichi Araki, Niiza; Masayuki Tamura, Tokyo; Takahiro Naka, Fujimi; Nobuhiro Saito, Tokyo; Hiroshi Kitagawa, Kawagoe; Takeyoshi Usui, Honjo; Shigeru Sato, Kamifukuoka, all of Japan

[73] Assignees: Honda Giken Kogyo Kabushiki Kaisha, Tokyo; Yamashita Rubber Co., Ltd, Saitama; Nippon Zeon Co., Ltd., Tokyo, all of Japan

[21] Appl. No.: 113,723

[22] Filed: Aug. 27, 1993

Related U.S. Application Data

[63] Continuation of Ser. No. 915,886, Jul. 20, 1992, abandoned, which is a continuation of Ser. No. 607,211, Nov. 1, 1990, abandoned, which is a continuation of Ser. No. 278,506, Dec. 1, 1988, abandoned.

[30] Foreign Application Priority Data

Dec. 2, 1987 [JP] Japan ................. 62-304719

[51] Int. Cl.$^6$ ............ C08F 279/02; C08F 265/08; C08F 8/42; F16G 1/28
[52] U.S. Cl. ................. 525/274; 525/329.1; 525/332.5; 525/338; 525/368; 474/202
[58] Field of Search ................. 525/274, 329.1, 332.5, 525/338, 368

[56] References Cited

U.S. PATENT DOCUMENTS

| | | | |
|---|---|---|---|
| 2,784,172 | 3/1957 | Slocombe et al. | 525/274 |
| 3,522,222 | 7/1970 | Taylor | 525/274 |
| 3,823,122 | 7/1974 | Schuh et al. | 525/274 |
| 4,192,790 | 3/1980 | McKinstry | 260/31.2 |
| 4,713,409 | 12/1987 | Hayes . | |
| 4,720,526 | 1/1988 | Roland | 525/273 |
| 4,822,654 | 4/1989 | Takemura | 525/108 |
| 4,918,144 | 4/1990 | Fukuda . | |
| 5,208,294 | 5/1993 | Brown | 525/263 |

FOREIGN PATENT DOCUMENTS

| | | | |
|---|---|---|---|
| 0139043 | 2/1985 | European Pat. Off. . | |
| 57-12145 | 1/1982 | Japan . | |
| 57-12146 | 1/1982 | Japan . | |
| 57-76343 | 5/1982 | Japan . | |
| 57-204352 | 12/1982 | Japan . | |
| 58-78904 | 5/1983 | Japan . | |
| 58-79045 | 5/1983 | Japan . | |
| 58-91947 | 6/1983 | Japan . | |
| 0172749 | 9/1985 | Japan | 525/329.3 |
| 60-172749 | 9/1985 | Japan | 525/329.3 |
| 1133282 | 6/1986 | Japan | 525/274 |

OTHER PUBLICATIONS

Translation of Japan 60-172749 (Sep. 1985).
Database Chemical Abstracts, (Host: STN), 1988, abstract No. 110(10): 77287w, Columbus, Ohio, US; & JP-A-63 175 045 (Nippon Zeon Co.) 19 Jul. 1988 *Last IT-field*.

*Primary Examiner*—Vasu S. Jagannathan
*Attorney, Agent, or Firm*—Lyon & Lyon

[57] ABSTRACT

A rubber composition comprising 100 parts by weight of an ethylenically unsaturated nitrile-conjugated diene high-saturation copolymer rubber containing 20 weight % or less of conjugated diene units, and 1–100 parts by weight of an unsaturated carboxylic acid metal salt having the general formula:

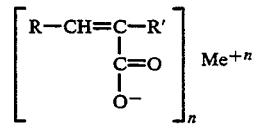

wherein R and R' represent aliphatic or aromatic hydrocarbon groups or a hydrogen atom, which may be the same or different from each other, Me represents a metal selected from the group consisting of Be, Mg, Ca, Sr, Ba, Ti, Cr, Mo, Mn, Fe, Co, Ni, Cu, Ag, Zn, Cd, Hg, Al, Sn, Pb and Sb, and n is an integer of 2–4.

6 Claims, 3 Drawing Sheets

HEAT-RESISTANT, OIL-RESISTANT RUBBER COMPOSITION

"This Application is a continuation of application Ser. No. 07/915886, filed Jul. 20, 1992, which application is a continuation of Ser. No. 07/607211, filed Nov. 1, 1990, which Application in turn is a continuation of Ser. No. 07/278506, filed Dec 1, 1988, all now abandoned."

BACKGROUND OF THE INVENTION

The present invention relates to a rubber composition having excellent heat resistance and oil resistance and good workability, and more particularly to a rubber composition having not only excellent heat resistance, oil resistance and workability but also high modulus which makes it suitable for various types of toothed belts driven under a high load.

Toothed belts are used as power transmission means, and as engine power has been increasing in recent years, the toothed belts have been required to have higher strength to bear an increasingly higher load.

A toothed belt is generally composed of a surface layer made of a woven fabric, etc. and having a toothed shape, a rubber layer for keeping the toothed shape and reinforcing cords, and the toothed belt is subjected to the biggest stress at the bottom of each tooth when meshed with pulley teeth to transmit power. Since this stress is substantially sustained by the rubber layer, the rubber layer should have high modulus so that the toothed belt can withstand a high load.

High modulus can be obtained by using urethane rubbers, but the urethane rubbers are poor in heat resistance and oil resistance. Since many of the toothed belts are used as means for transmitting power generated by engines, heat resistance and oil resistance are extremely important properties. Accordingly, the urethane rubbers are not suitable for toothed belts.

In general, an increase in the amount of carbon black in a rubber composition tends to increase its modulus, but it also increases the Mooney viscosity of the unvulcanized rubber, lowering the workability of the rubber. In addition, the addition of too much carbon black results in higher compression set (smaller rubber elasticity) and larger variation of heat resistance and oil resistance with time.

In view of the above problems, various proposals were made.

Japanese Patent Laid-Open No. 57-12145 discloses a heat-resistant, oil-resistant toothed belt produced by providing an epichlorohydrin rubber between tensile members and the belt back surface, and NBR, CR, SBR or natural rubber in the belt back surface portion and tooth portions.

Japanese Patent Laid-Open No. 57-12146 discloses an oil-resistant toothed belt comprising an NBR portion between tensile members and a back surface, and other belt back surface portions and tooth portions made of CR, SBR or natural rubber.

However, these toothed belts do not have sufficient heat resistance and oil resistance which can meet the levels required recently.

Japanese Patent Laid-Open No. 57-176343 discloses a toothed belt made of a rubber composition comprising 100 parts by weight of rubber, 0.2-5.0 parts by weight of a silane coupling agent, 10-60 parts by weight of silica and 2-60 parts by weight of carbon black. Further, Japanese Patent Laid-Open No. 57-204352 discloses a power transmission belt comprising a compressed rubber layer made of a rubber-short fiber composite composition comprising 100 parts by weight of rubber, 0.1-5.0 parts by weight of a silane coupling agent, 10-60 parts by weight of a water-containing silicic acid, 2-60 parts by weight of carbon black and 2-40 parts by weight of short fibers. In these rubber compositions, a specific rubber component is a chloroprene rubber. These rubber compositions are excellent in adhesion to tensile cords and wear resistance, but they are poor in heat resistance and oil resistance.

Japanese Patent Laid-Open Nos. 58-78904 and 58-79045 disclose rubber compositions made mainly of EPR or EPDM. These rubber compositions are used for paper-feeding endless belts and conveyor belts, but they do not have sufficient modulus, heat resistance and oil resistance for toothed belts for transmitting engine power.

Further, Japanese Patent Laid-Open No. 58-91947 discloses a high-hardness, high-elasticity rubber composition for toothed belts comprising 100 parts by weight of rubber and 5-50 parts by weight of a high-crystallinity, low-unsaturation thermoplastic polymer. However, this rubber composition has poor properties at an elevated temperature.

OBJECT AND SUMMARY OF THE INVENTION

Accordingly, an object of the present invention is to provide a rubber composition having not only excellent thermal resistance and oil resistance but also good workability, which can have higher modulus without losing its elasticity.

As a result of intense research in view of the above problems, the inventors have found that a rubber composition capable of achieving the above object can be obtained by incorporating an unsaturated carboxylic acid metal salt into a particular rubber. The present invention is based on this finding.

Thus, the rubber composition of the present invention comprises 100 parts by weight of an ethylenically unsaturated nitrile-conjugated diene high-saturation copolymer rubber containing 20 weight % or less of conjugated diene units, and 1–100 parts by weight of an unsaturated carboxylic acid metal salt.

DETAILED DESCRIPTION OF THE INVENTION

Figure 1:
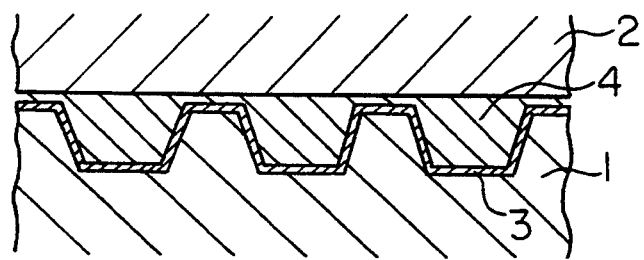
FIG. 1 is a cross-sectional view showing the formation of a toothed belt by using the rubber composition of the present invention.

In the ethylenically unsaturated nitrile-conjugated diene high-saturation copolymer rubber contained in the rubber composition according to the present invention, ethylenically unsaturated nitrile means a compound in which one end of an ethylenically unsaturated bond is added to a nitrile group (—CN), and its typical examples include acrylonitrile, methacrylonitrile, etc. On the other hand, conjugated diene means a compound in which two double bonds are connected to each other via only one single bond, and its typical examples are butadiene, isoprene, etc. The preferred combination is acrylonitrile-butadiene.

To provide the ethylenically unsaturated nitrile-conjugated diene rubber with high saturation, the hydrogenation of the rubber is conducted. The hydrogenation serves to saturate at least 80 of the unsaturated bonds of the rubber. When the degree of saturation is less than 80%, the rubber's heat resistance and oil resistance is low, and when it exceeds a preferred value of 99%, the rubber's elasticity shown by compression set, etc. is decreased too much. The more preferred degree of saturation of the rubber is 90–98%.

The unsaturated carboxylic acid metal salts added to the high-saturation copolymer rubber according to the present invention are those in which unsaturated carboxylic acids having one or more carboxylic groups are ionically bonded to metals. The unsaturated carboxylic acids which may be used include monocarboxilic acids such as acrylic acid, methacrylic acid, etc., dicarboxylic acids such as maleic acid, fumaric acid, itaconic acid, etc. The metals which may be used include Be, Mg, Ca, Sr, Ba, Ti, Cr, Mo, Mn, Fe, Co, Ni, Cu, Ag, Zn, Cd, Hg, Al, Sn, Pb, Sb, etc. The preferred metals are Mg, Ca, Zn and Al.

A particularly preferred unsaturated carboxylic acid-metal salt is expressed by the following general formula:

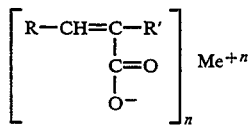

wherein R and R' represent aliphatic and aromatic hydrocarbon groups or a hydrogen atom, which may be the same or different from each other, Me represents the above metals, and n is an integer of 2–4.

In the rubber composition of the present invention, the content of the unsaturated carboxylic acid metal salt is 1–100 parts by weight (phr) per 100 parts by weight of the rubber component. When the unsaturated carboxylic acid metal salt is less than 1 phr, sufficient effects cannot be obtained, and when it exceeds 100 phr, too much curing takes place. The preferred content of the unsaturated carboxylic acid metal salt is 5–40 phr.

The rubber composition of the present invention may contain an organic peroxide as a vulcanizer (cross-linking agent). The preferred organic peroxides include peroxides such as benzoyl peroxide, lauroyl peroxide, di-t-butyl peroxide, acetyl peroxide, t-butyl perbenzoic acid, dicumyl peroxide, perbenzoic acid, peracetic acid, t-butyl peroxypivalate, etc. and diazo compounds such as azobisisobutyronitrile, etc.

The content of the organic peroxide is 1–10 phr. When it is less than 1 phr, sufficient cross-linking does not take place, and when it exceeds 10 phr, the resulting rubber composition does not have sufficient rubber elasticity. The preferred content of the organic peroxide is 1–5 phr.

The rubber composition of the present invention may further contain, if necessary, vulcanization aids, vulcanization controlling agents (retarders), anti-aging agents, anti-oxidants, reinforcing agents, etc.

The vulcanization aids are metal oxides such as zinc oxide, etc.

The retarders are used for preventing undesired premature vulcanization such as scorching during processing, spontaneous vulcanization during storing, etc. Typical examples of the retarders include thiazoles such as mercaptobenzothiazole (MBT), dibenzothiazyl disulfide (MBTS), zinc 2-mercaptobenzothiazole (ZnMBT), etc., sulfenic amides such as N-cyclohexyl-2-benzothiazole sulfenic amide etc., and thiurams such as tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), etc. They may be used together with aldehyde-amines, guanidines, etc.

The anti-aging agents are used for preventing the aging of the rubber composition such as hardening, softening, cracking, losing of elasticity, etc. after vulcanization. Their typical examples include 2-mercaptobenzimidazole zinc salt (MBZ), 2,2,4-trimethyl-1,2-dihydroquinoline polymer (TMDQ), N,N'-diphenyl-p-phenylenediamine (DPPD), p-phenylenediamine, etc.

The reinforcing agents are used for improving mechanical properties of the vulcanized rubbers, such as tensile strength, hardness, tear strength, etc., and their typical example is carbon black.

Figure 2:
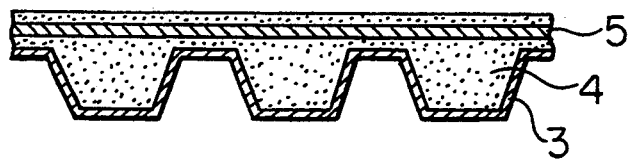
FIG. 2 is a cross-sectional view showing a toothed belt made of the rubber composition of the present invention.

The rubber composition of the present invention is molded and vulcanized by means of a die having the desired toothed shape and size as shown in FIG. 1. The die is constituted by a lower die portion 1 having a toothed inner surface, and an upper die portion 2 having a flat inner surface. To produce an endless toothed belt, the lower die portion 1 is preferably a cylindrical one, and the upper die portion 2 is constituted by a diaphragm. A surface layer 3 made of a fabric, a film, etc. is provided on the toothed surface of the lower die portion 1, and a sheet of the rubber composition is placed on the surface layer 3. While heating, the die is closed to form a rubber layer 4 in a toothed shape as shown in FIG. 1. In this case, the surface layer 3 is also deformed along the toothed surface. When a film is used, it may be deformed in advance. Next, high-tensile strength cords 5 made of steel, glass fibers, nylon, etc. are wound around the rubber layer (tooth portion) 4, and a rubber back layer is placed thereon. After that, the upper die portion 2 is closed again to carry out the vulcanization of the rubber. Thus, a toothed belt shown in FIG. 2 is obtained. The vulcanization temperature is generally 140°–180° C., and the vulcanization time is 15–50 minutes.

As described above, the rubber composition of the present invention comprises an ethylenically unsaturated nitrile-conjugated diene copolymer rubber having high saturation, and unsaturated carboxylic acid metal salt. Accordingly, without adding a large amount of a carbon black, high modulus can be achieved together with excellent heat resistance and oil resistance. The reason therefor is not necessarily clear, but it may be considered that the unsaturated carboxylic acid metal salt is cross-linked to the rubber component, forming a network structure as a whole.

The present invention will be explained in further detail by means of the following Examples.

EXAMPLE 1

100 parts by weight of hydrogenated acrylonitrile-butadiene rubber (manufactured by Nippon Zeon Co., Ltd., butadiene content: 65 weight %, percentage of double bonds saturated by hydrogenation (degree of saturation): 90%) were blended with zinc methacrylate as an unsaturated carboxylic acid metal salt, and a combination of two organic peroxides selected from N-butyl-4,4-bis (t-butylperoxy) valerate, dicumyl peroxide and $\alpha, \alpha'$-bis (t-butylperoxy-m-isopropyl) benzene together with other additives in proportions shown in Table 1 by a roll, to provide rubber compositions of the present invention (Sample Nos. 1–6).

To evaluate the workability of the resulting rubber compositions, a Mooney viscosity $ML_{1+4}$ (125° C.) of each sample was measured.

In addition, each sample was vulcanized at 160° C. for 30 minutes, and the resulting vulcanized rubber was measured with respect to hardness $H_s$ (JIS-A) and modulus ($M_{50}$, $M_{100}$) at room temperature, and tensile strength $T_B$ and elongation $E_B$ respectively according to JIS K 6301. Further, each sample was kept at a compression ratio of 25% at 150° C. for 22 hours according to JIS K 6301, to measure its compression set. The results are shown in Table 1.

TABLE 1

| Composition (phr) | Sample No. 1 | 2 | 3 | 4 | 5 | 6 |
|---|---|---|---|---|---|---|
| Zp 2020[1] | 100 | 100 | 100 | 100 | 100 | 100 |
| ZnO[2] | 10 | 10 | 10 | 10 | 10 | 10 |
| Zn(MAA)$_2$[3] | 10 | 15 | 15 | 20 | 20 | 40 |
| MBZ[4] | 1 | 1 | 1 | 1 | 1 | 1 |
| Naugard 445[5] | 1 | 1 | 1 | 1 | 1 | 1 |
| Carbon Black HAF[6] | 30 | 30 | — | 40 | 50 | 50 |
| Carbon Black SRF[7] | — | — | 15 | — | — | — |
| Perhexa V-40[8] | 10 | 10 | — | — | — | — |
| Percumyl D-40[9] | — | — | 12 | 12 | 12 | 12 |
| Perxymone F-40[10] | 5 | 5 | 6 | 6 | 6 | 6 |
| Colloidal Sulfur[11] | 0.2 | 0.3 | 0.3 | 0.3 | 0.3 | 0.3 |
| TMTD[12] | 1 | 1 | 1 | 1 | 1 | 1 |
| MBT[13] | — | 0.5 | 0.5 | 0.5 | 0.5 | 0.5 |
| Mooney Viscosity of Unvulcanized Rubber $ML_{1+4}$ (125° C.) | 46 | 46 | 42 | 47 | 54 | 55 |
| Properties of Vulcanized Rubber | | | | | | |
| Hardness $H_s$[14] | 78 | 78 | 71 | 84 | 87 | 93 |
| Modulus $M_{50}$[15] (kg/cm$^2$) | 30 | 33 | 22 | 56 | 72 | —[20] |
| $M_{100}$[16] | 64 | 72 | 45 | 149 | 176 | 274 |
| Tensile Strength $T_B$ (kg/cm$^2$)[17] | 307 | 329 | 293 | 330 | 278 | 304 |
| Elongation $E_B$[18] (%) | 310 | 320 | 340 | 190 | 150 | 110 |
| Compression Set[19] CS(%) | 35 | 36 | 31 | 36 | 36 | 41 |

Note
[1] Hydrogenated acrylonitrile-butadiene rubber (butadiene content: 65 weight %, degree of saturation: 90%) manufactured by Nippon Zeon Co., Ltd.
[2] Zinc oxide vulcanization aid (particle size #1) manufactured by Sakai Kagaku K.K.
[3] Zinc methacrylate manufactured by Asada Kagaku K.K.
[4] Anti-aging agent (zinc 2-mercaptobenzimidazole) manufactured by Kawaguchi Kagaku K.K.
[5] Anti-aging agent (4,4'-($\alpha,\alpha$-dimethylbenzyl)diphenylamine) manufactured by Uniroyal
[6] Carbon black (High-Abrasion Furnace Black) manufactured by Tokai Carbon K.K.
[7] Carbon black (Semi-Reinforcing Furnace Black) manufactured by Tokai Carbon K.K.
[8] Organic peroxide vulcanizer (N-butyl-4,4-bis (t-butylperoxy) valerate as an organic peroxide 40 weight %, CACO$_3$: 60 weight %) manufactured by Nippon Oil and Fats Co., Ltd.
[9] Organic peroxide vulcanizer (dicumyl peroxide as an organic peroxide: 40 weight %, CACO$_3$: 60 weight %) manufactured by Nippon Oil and Fats Co., Ltd.
[10] Organic peroxide vulcanizer ($\alpha,\alpha'$-bis (t-butylperoxy-m-isopropyl) benzene as an organic peroxide: 40 weight %, CACO$_3$: 60 weight %) manufactured by Nippon Oil and Fats Co., Ltd.
[11] Retarder manufactured by Kawaguchi Kagaku K.K.
[12] Tetramethylthiuram disulfide manufactured by Kawaguchi Kagaku K.K.
[13] Metcaptobenzothiazole manufactured by Kawaguchi Kagaku K.K.
[14] Measured at room temperature according to JIS-A
[15] Measured at 50-% elongation at room temperature according to JIS K 6301.
[16] Measured at 100-% elongation at room temperature according to JIS K 6301.
[17] Measured at room temperature according to JIS K 6301.
[18] Measured at room temperature according to JIS K 6301.
[19] Expressed by strain (%) measured after a specimen of 29 mm in diameter and 12.70 mm in thickness was kept at a compression ratio of 25% at 150° C. for 22 hours according to JIS K 6301.
[20] Not measured As is clear from the above results, since the rubber composition of the present invention has sufficiently low Mooney viscosities, they have good workability. In addition, their properties after vulcanization are excellent.

EXAMPLE 2

To evaluate heat resistance and oil resistance, comparison was made between the high-modulus rubber composition (Sample No. 5) of the present invention and a rubber composition (Sample No. 10) having the same composition as Sample No. 5 except for containing no zinc methacrylate. The vulcanization conditions were the same as in Example 1.

The comparison of heat resistance was conducted by measuring the hardness $H_s$, tensile strength $T_B$, elongation $E_B$ and modulus ($M_{50}$, $M_{100}$) of each sample at normal condition, after heating at 140° C. for 70 hours, and after heating at 140 C. for 480 hours, and observing the changes of the above properties. The comparison of oil resistance was carried out by measuring the hardness $H_s$, tensile strength $T_B$, elongation $E_B$ and modulus ($M_{50}$, $M_{100}$) of each sample after immersion in a JIS #1 oil at 150° C. for 70 hours, and after immersion in a Shell engine oil "Ultra-U" at 140° C. for 480 hours, and observing the changes of the above properties. The change of each property was expressed by a percentage (%) thereof to that at normal condition. The results are shown in Table 2.

TABLE 2

| | Sample No. 5 | 10 |
|---|---|---|
| Normal Condition | | |
| Hardness $H_s$ | 87 | 78 |
| Tensile Strength $T_B$ (kg/cm$^2$) | 278 | 266 |
| Elongation $E_B$ (%) | 150 | 190 |

TABLE 2-continued

| | Sample No. | |
|---|---|---|
| | 5 | 10 |
| Modulus (kg/cm$^2$) | | |
| M$_{50}$ | 72 | 34 |
| M$_{100}$ | 176 | 92 |
| Heat Resistance Measured After Heating at 140° C. for 70 Hours | | |
| ΔH$_S$ (%) | +4 | +8 |
| ΔT$_B$ (%) | −6 | +6 |
| ΔE$_B$ (%) | −25 | −16 |
| ΔM$_{50}$ (%) | +73 | +79 |
| ΔM$_{100}$ (%) | +43 | +63 |
| Heat Resistance Measured After Heating at 140° C. for 480 Hours | | |
| ΔH$_S$ (%) | +8 | +15 |
| ΔT$_B$ (%) | −19 | −25 |
| ΔE$_B$ (%) | −63 | −68 |
| ΔM$_{50}$ (%) | +242 | +432 |
| ΔM$_{100}$ (%) | — | — |
| Oil Resistance Measured After immersion in JIS #1 Oil at 150° C. for 70 Hours | | |
| ΔH$_S$ (%) | +2 | +3 |
| ΔT$_B$ (%) | +4 | −1 |
| ΔE$_B$ (%) | −13 | −5 |
| ΔM$_{50}$ (%) | +15 | +6 |
| ΔM$_{100}$ (%) | +26 | +12 |
| Oil Resistance Measured After Immersion in Engine Oil at 140° C. for 480 Hours | | |
| ΔH$_S$ (%) | +1 | +5 |
| ΔT$_B$ (%) | −51 | −67 |
| ΔE$_B$ (%) | −56 | −63 |
| ΔM$_{50}$ (%) | +53 | +74 |
| ΔM$_{100}$ (%) | — | — |

As is clear from Table 2, the changes of heat resistance and oil resistance were small in the rubber composition (Sample No. 5) of the present invention than in the rubber composition (Sample No. 10) containing no zinc methacrylate. Particularly with respect to heat resistance at 140° C. ×480 hours, the variation of M$_{50}$ (ΔM$_{50}$) of Sample No. 5 was +242%, which is much smaller than +432% of Sample No. 10, meaning that the rubber composition of the present invention is less susceptible to aging than the conventional one. Further, with respect to oil resistance, although both of Sample Nos. 5 and 10 showed substantially equally small variation of modulus by short immersion in a JIS #1 oil at 150° C. for 70 hours, Sample No. 5 showed smaller ΔM$_{50}$ than Sample No. 10 in the case of long immersion in an engine oil at 140° C. for 480 hours. Thus, it is clear that the rubber composition of the present invention has better heat resistance and oil resistance.

EXAMPLE 3

The low-modulus rubber composition (Sample No. 3) of the present invention was compared with a rubber composition (Sample No.11) containing no zinc methacrylate with respect to heat resistance and oil resistance. The compositions (phr) of Sample Nos. 3 and 11 were as follows:

| | Sample No. | |
|---|---|---|
| Composition (phr) | 3 | 11 |
| Zp 2020 | 100 | 100 |
| ZnO | 10 | 10 |
| Zn(MAA)$_2$ | 15 | — |
| SRF | 15 | 30 |
| MBZ | 1 | 1 |
| Naugard 445 | 1 | 1 |
| Percumyl D—40 | 12 | 10 |
| Perxymone F—40 | 6 | 5 |
| Colloidal Sulfur | 0.3 | 0.3 |
| TMTD | 1 | 1 |
| MBT | 0.5 | 0.5 |

The vulcanization conditions for each sample were the same as in Example 1. The vulcanized rubbers were measured with respect to hardness H$_S$, tensile strength T$_B$, elongation E$_B$ and modulus (M$_{50}$, M$_{100}$) at normal condition, after heating at 140° C. for 70 hours, after immersion in a JIS #1 oil at 150° C. for 70 hours and after immersion in an engine oil at 140° C. for 70 hours, and the variation of each property was evaluated. The results are shown in Table 3.

TABLE 3

| | Sample No. | |
|---|---|---|
| | 3 | 11 |
| Normal Condition | | |
| Hardness H$_S$ | 71 | 71 |
| Tensile Strength T$_B$ (kg/cm$^2$) | 293 | 282 |
| Elongation E$_B$ (%) | 340 | 290 |
| Modulus (kg/cm$^2$) | | |
| M$_{50}$ | 22 | 23 |
| M$_{100}$ | 45 | 47 |
| Heat Resistance Measured After Heating at 140° C. for 70 Hours | | |
| ΔH$_S$ (%) | +4 | +7 |
| ΔT$_B$ (%) | +10 | +6 |
| ΔE$_B$ (%) | −3 | −21 |
| ΔM$_{50}$ (%) | +14 | +67 |
| ΔM$_{100}$ (%) | +30 | +92 |
| Oil Resistance Measured After Immersion in JIS #1 Oil at 150° C. for 70 Hours | | |
| ΔH$_S$ (%) | +1 | +2 |
| ΔT$_B$ (%) | ±0 | −6 |
| ΔE$_B$ (%) | −5 | −10 |
| ΔM$_{50}$ (%) | −4 | −4 |
| ΔM$_{100}$ (%) | +1 | +2 |
| Oil Resistance Measured After Immersion in Engine Oil at 140° C. for 70 Hours | | |
| ΔH$_S$ (%) | +1 | −1 |
| ΔT$_B$ (%) | ±0 | −23 |
| ΔE$_B$ (%) | −7 | −17 |
| ΔM$_{50}$ (%) | −8 | −8 |
| ΔM$_{100}$ (%) | −2 | −4 |

As is clear from Table 3, even in the case of low-modulus rubber compositions, the rubber composition containing zinc methacrylate (Sample No. 3) showed higher heat resistance and oil resistance than that containing no zinc methacrylate (Sample No. 11), since the former showed smaller variation of each property, particularly modulus, after heating or oil immersion for a long period of time.

Comparative Example 1

Rubber compositions containing no unsaturated carboxylic acid metal salt as shown in Table 4 were prepared, and each of them was measured with respect to Mooney viscosity ML$_{1+4}$ (125° C.) in an unvulcanized state and rubber properties after vulcanization. The results are shown in Table 4.

TABLE 4

| Composition (phr) | Sample No. 12 | Sample No. 13 |
|---|---|---|
| Zp 2020 | 100 | 100 |
| ZnO | 6 | 6 |
| Stearic Acid | 1 | 1 |
| Carbon Black | | |
| HAF | 15 | 70 |
| SRF | 70 | 70 |
| Sulfur | 0.75 | 0.75 |
| TMTD | 1.2 | 1.2 |
| TETD[(1)] | 1.6 | 1.6 |
| MBT | 0.5 | 0.5 |
| Mooney Viscosity of Unvulcanized Rubber $ML_{1+4}$ (125° C.) | 85 | 200< |
| Properties of Vulcanized Rubber[(2)] | | |
| Hardness $H_s$ | 84 | 93 |
| Tensile Strength $T_B$ (kg/cm²) | 187 | 268 |
| Elongation $E_B$ (%) | 270 | 140 |
| Modulus $M_{100}$ (kg/cm²) | 101 | 226 |
| Compression Set CS (%) | 44 | 50 |

Note [(1)]Tetraethylthiuram disulfide
[(2)]Hardness, tensile strength, elongation and modulus were measured at room temperature. Compression set was measured at a compression ratio of 25% at 150° C. for 22 hours.

As is clear from Table 4, the acrylonitrile-butadiene rubber composition containing no unsaturated carboxylic acid metal salt had too high Mooney viscosity when its modulus is increased. In the case of forming a toothed belt, it is desired that a rubber composition has a Mooney viscosity $ML_{1+4}$(125° C.) of about 50 or less. In this respect, it cannot be said that Sample No. 12 has desirable workability because it has a Mooney viscosity $ML_{1+4}$ (125° C.) of 85. And Sample No. 13 has a Mooney viscosity $ML_{1+4}$ (125° C.) exceeding 200, meaning that its forming is extremely difficult. This is due to the fact that they do not contain an unsaturated carboxylic acid metal salt, and that they instead contain a large amount of carbon black for improving their modulus.

Figure 3:
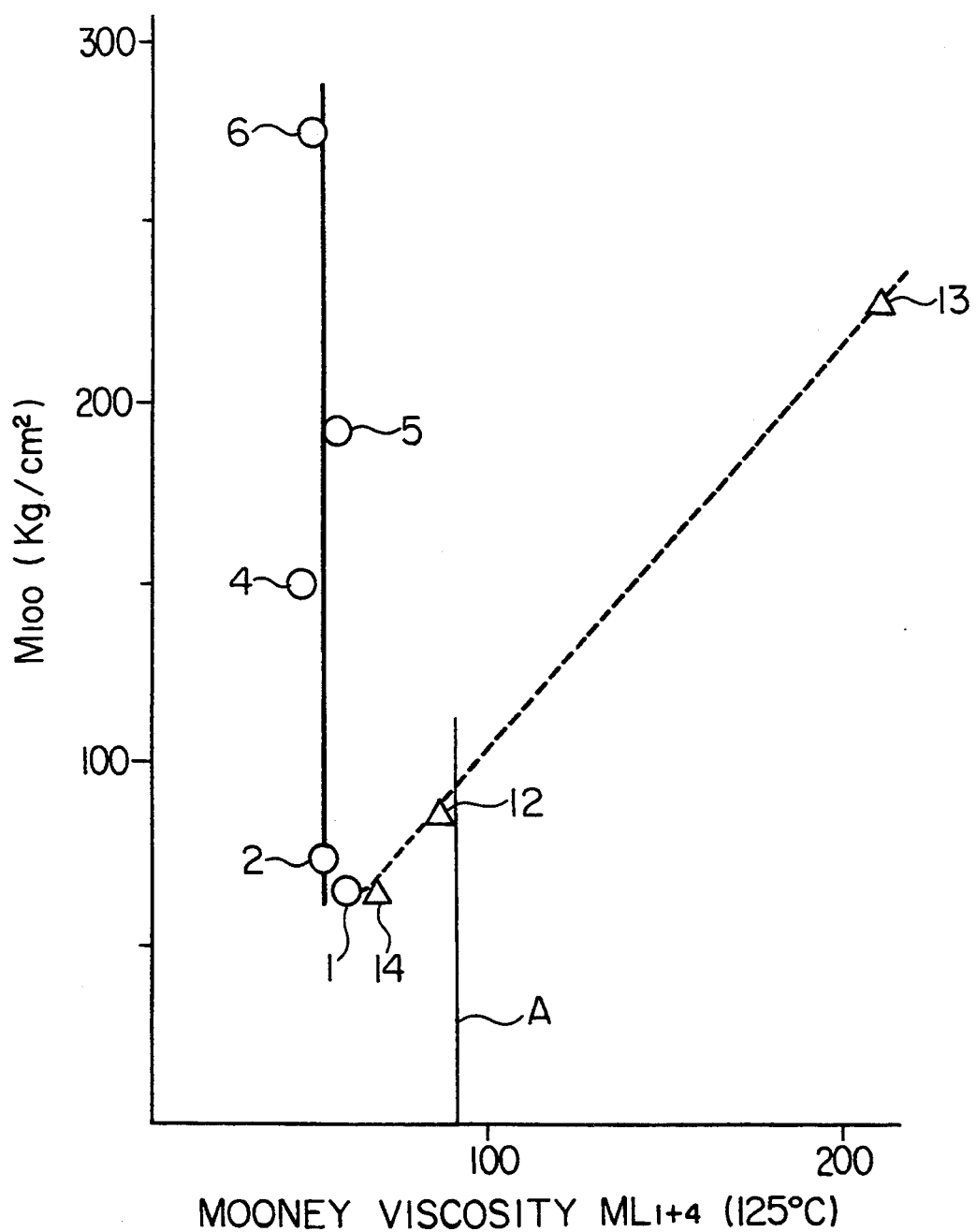
FIG. 3 is a graph showing the relations between $M_{100}$ and Mooney viscosity.

FIG. 3 is a graph showing the relations of $M_{100}$ and a Mooney viscosity $ML_{1+4}$ (125° C.). In the figure, circles represent the rubber compositions of the present invention. For comparison, those containing carbon black in place of unsaturated carboxylic acid metal salt to increase $M_{100}$ are shown by triangles in the figure. Incidentally, numbers attached to the circles and the triangles show sample numbers. Incidentally, Sample No. 14 had the same composition as that of Sample No. 12 except that the former contains carbon black in an amount of 30 phr.

As is clear from FIG. 3, in the case of Samples of Comparative Examples containing no unsaturated carboxylic acid metal salt, the Mooney viscosity increases as the $M_{100}$ increases, and high modulus cannot be achieved without exceeding the forming limit (Mooney viscosity=90). On the other hand, in the case of the rubber compositions of the present invention, their Mooney viscosities were substantially unchanged despite the increase in $M_{100}$. This means that the rubber compositions of the present invention do not suffer from deterioration of workability even when their modulus is increased.

Figure 4:
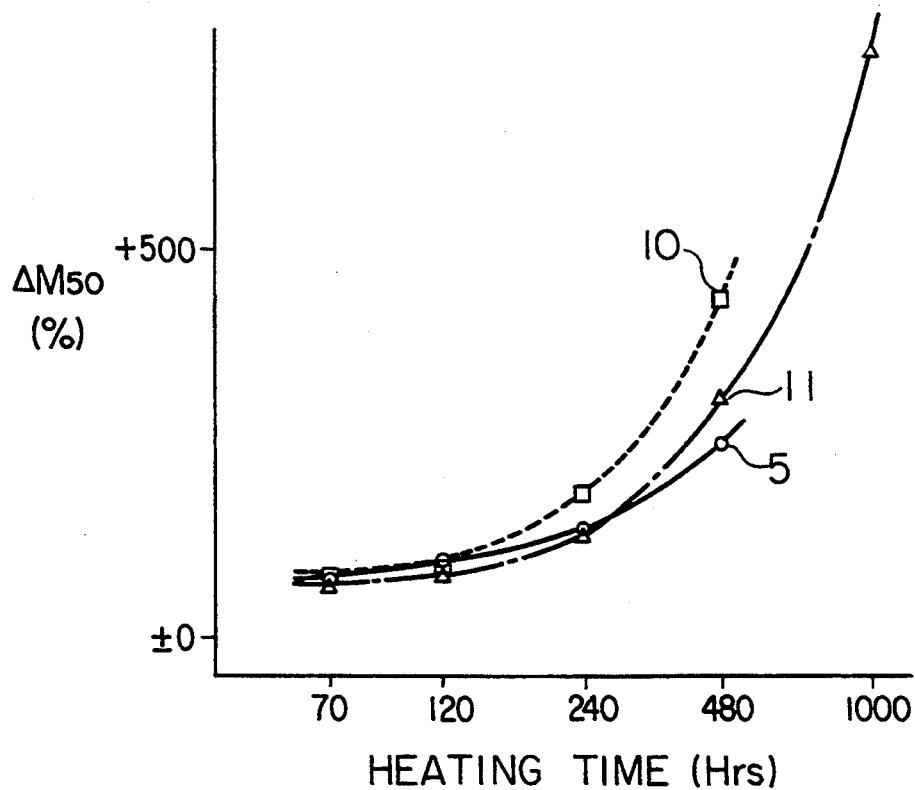
FIG. 4 is a graph showing the variation of $\Delta M_{50}$ with time under heated condition.

FIG. 4 is a graph showing the variation of $\Delta M_{50}$ with time for Sample No. 5 (rubber composition of the present invention) and Sample Nos. 10 and 11 (Comparative Examples) when heated at 140° C. Sample No. 5 had $\Delta M_{50}$ which was smaller than that of Sample No. 10, and $\Delta M_{50}$ of Sample No. 11 increased drastically after heating for a long period of time. Accordingly, it is clear that the rubber composition of the present invention has better heat resistance than those containing no unsaturated carboxylic acid metal salt (Comparative Examples).

Figure 5:
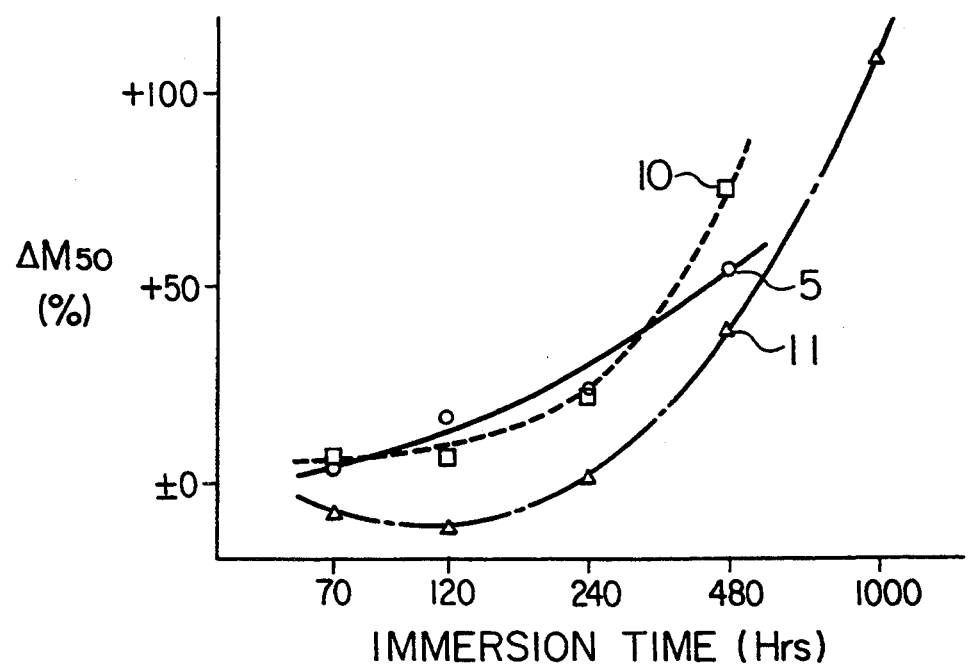
FIG. 5 is a graph showing the variation of $\Delta M_{50}$ with time under oil immersion condition.

FIG. 5 is a graph showing the variation of $\Delta M_{50}$ with time for Sample Nos. 5, 10 and 11 when immersed in an engine oil (Ultra-U) at 140° C. Although Sample No. 5 (present invention) does not suffer from large variation of $\Delta M_{50}$ even after immersion for a long period of time, $\Delta M_{50}$ of Sample Nos. 10 and 11 tends to increase drastically by immersion for a long period of time. This shows that the rubber composition of the present invention has better oil resistance than those containing no unsaturated carboxylic acid metal salt (Comparative Examples).

As described above in detail, since the rubber composition of the present invention is essentially based on an ethylenically unsaturated nitrile-conjugated diene high-saturation copolymer rubber and an unsaturated carboxylic acid metal salt, it shows not only good rubber properties but also excellent heat resistance and oil resistance. In addition, it is also excellent in workability.

The rubber composition of the present invention having such characteristics are highly suitable for toothed belts for transmitting engine power and any other members usable under severe conditions of stress, temperature, oil, etc.

What is claimed is:

1. A toothed belt for use as power transmission means, comprising a layer of vulcanized rubber having a plurality of tooth shaped projections on one surface thereof, said vulcanized rubber prepared from a rubber composition consisting essentially of an hydrogenated acrylonitrile-butadiene copolymer having a degree of hydrogenation of approximately 80% to about 99%, and 1 to 100 parts by weight per 100 parts by weight of said copolymer of an unsaturated carboxylic acid metal salt of the formula:

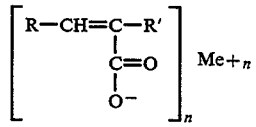

wherein R and R' are aliphatic or aromatic hydrocarbon groups or a hydrogen atom which may be the same or different from each other, Me is a metal selected from the group consisting of Mg, Ca, Sr, Zn, and Al, and n is an integer of 2 or 3.

2. The toothed belt of claim 1 in which said hydrogenated copolymer has a degree of hydrogenation of about 90% to 98%.

3. The toothed belt of claim 1 in which said carboxylic acid metal salt is about 5 to about 40 parts by weight per 100 parts by weight of said hydrogenated acrylonitrile butadiene copolymer.

4. The toothed belt of claim 1, 2 or 3 in which said unsaturated carboxylic acid metal salt is zinc dimethacrylate.

5. The toothed belt of claim 1 or 2 in which said belt includes a layer of woven fabric adjacent said surface of vulcanized rubber having toothed-shaped projections, and said acid metal salt is zinc dimethacrylate and is about 5 to about 40 parts by weight per 100 parts by weight of said hydrogenated acrylonitrile-butadiene copolymer.

6. The toothed belt of claim 5 in which said belt includes a layer of high tensile strength cord adjacent said surface of vulcanized rubber opposite said surface having said tooth shaped projections.

* * * * *